(12) United States Patent
Lau et al.

(10) Patent No.: US 12,275,096 B2
(45) Date of Patent: Apr. 15, 2025

(54) BUOYANCY PROVISIONS FOR FACILITATING UNDERWATER FRICTION WELDING

(71) Applicant: FUSEMATIC CORPORATION, Ormond Beach, FL (US)

(72) Inventors: Harvey Lau, Houston, TX (US); John M. Griffin, Houston, TX (US); Thomas Foley, Houston, TX (US); Mark Andrew Smith, Houston, TX (US); Richard Jackson, Houston, TX (US)

(73) Assignee: Fusematic Corporation, Pasadena, TX (US)

( * ) Notice: Subject to any disclaimer, the term of this patent is extended or adjusted under 35 U.S.C. 154(b) by 367 days.

(21) Appl. No.: 17/290,606

(22) PCT Filed: Oct. 31, 2019

(86) PCT No.: PCT/US2019/059155
§ 371 (c)(1),
(2) Date: Apr. 30, 2021

(87) PCT Pub. No.: WO2020/131229
PCT Pub. Date: Jun. 25, 2020

(65) Prior Publication Data
US 2021/0354252 A1 Nov. 18, 2021

Related U.S. Application Data

(60) Provisional application No. 62/754,295, filed on Nov. 1, 2018, provisional application No. 62/881,340, filed
(Continued)

(51) Int. Cl.
*B23K 37/02* (2006.01)
*B23K 20/12* (2006.01)
(Continued)

(52) U.S. Cl.
CPC .......... *B23K 37/02* (2013.01); *B23K 20/1245* (2013.01); *B23K 20/1285* (2013.01); *B23K 20/26* (2013.01); *B63B 22/00* (2013.01)

(58) Field of Classification Search
CPC ... B63B 2021/222; B63B 22/00; B63C 11/52; F16L 1/163; F16L 1/24; E21B 17/012;
(Continued)

(56) References Cited

U.S. PATENT DOCUMENTS 3,659,299 A 5/1972 Davidson
3,729,756 A * 5/1973 Cook ............... E21B 17/012
405/224.2
(Continued)

FOREIGN PATENT DOCUMENTS

JP 2009145818 A1 7/2009
WO 2019/104366 A1 6/2019

OTHER PUBLICATIONS

ISR for International Application PCT/US2019/059155.
(Continued)

*Primary Examiner* — Ajay Vasudeva
(74) *Attorney, Agent, or Firm* — Mark Andrew Smith

(57) ABSTRACT

A method and buoyancy system are disclosed for facilitating diver directed underwater friction welding (also known as friction welding) operations. Various illustrative embodiments of the method, buoyancy system and combined portable friction welding system and buoyancy provisions are disclosed for improving ease of diver use in making underwater joints.

15 Claims, 13 Drawing Sheets

Related U.S. Application Data on Jul. 31, 2019, provisional application No. 62/881,366, filed on Aug. 1, 2019.

(51) Int. Cl.
*B23K 20/26* (2006.01)
*B63B 22/00* (2006.01)

(58) Field of Classification Search
CPC ............ B23K 20/1245; B23K 20/1285; B23K 20/26; B23K 37/02
USPC .................................................. 441/133, 134
See application file for complete search history.

(56) References Cited

U.S. PATENT DOCUMENTS

| | | | | |
|---|---|---|---|---|
| 4,107,802 | A * | 8/1978 | Patinet | F16L 1/24 248/62 |
| 4,172,974 | A | 10/1979 | Budliger et al. | |
| 4,482,590 | A * | 11/1984 | Bouley | C08J 9/32 428/313.5 |
| 4,510,878 | A | 4/1985 | Breedlove | |
| 5,699,952 | A | 12/1997 | Fix | |
| 5,735,447 | A | 4/1998 | Fix | |
| 6,257,337 | B1 * | 7/2001 | Wells | E21B 17/012 405/195.1 |
| 6,270,387 | B1 * | 8/2001 | Nesheim | E21B 17/012 405/211 |
| 7,303,360 | B2 | 12/2007 | Nakagawa | |
| 7,540,690 | B2 | 6/2009 | Garcia et al. | |
| 7,770,777 | B2 | 8/2010 | Miller | |
| 9,103,472 | B2 | 8/2015 | Laborde et al. | |
| 9,656,389 | B2 | 5/2017 | Skrinde | |
| 2009/0093177 | A1 | 4/2009 | Reed | |
| 2009/0272855 | A1 | 11/2009 | Oram | |
| 2010/0065532 | A1 | 3/2010 | Champney | |
| 2015/0343558 | A1 | 12/2015 | O'Leary et al. | |
| 2018/0169977 | A1 | 6/2018 | Wu et al. | |
| 2018/0252334 | A1 | 9/2018 | Harrop et al. | |

OTHER PUBLICATIONS

Written Opinion for International Application PCT/US2019/059155.

DEMA Show 2018 New Product Coverage,section on Trim Weight System for DSLR and Mirrorless Housings, published on Ikelite webpage accessible at at the Nov. 14-17, 2018 DEMA Show at the Las Vegas. Ikelite is a US Company located in Indianapolis, Indiana. No date is available on Wayback Machine, but purports to report addressing this as a new product at the Nov. 14-17, 2018 DEMA Show at the Las Vegas and identifies this product as available for pre-order for December shipment. See entire cited section.

Instruction Manual for Ikelite Trim Weight System published on Ikelite webpage at https://docs.ikelite.com/instructions/47140-47141-instructions.pdf. Ikelite is a US Company in Indianapolis, Indiana. This instruction manual for the product identified above has no Wayback Machine archive for a date. The content may have been disclosed at the DEMA Show between Nov. 14-17, 2018 and/or distributed with product shipments in December or so or linked to the webpage of #1, above, after the DEMA Show. See the entire document.

Young, Underwater Friction Stud Welding System-One step Closer to the Fleet, Faceplate—The Official Newsletter for the Divers and Salvors of teh United States Navy, vol. 11, No. 1, p. 3 (Apr. 2007). Refer to text and photos on p. 3 for general background defining the state of the art of underwater friction stud welding. This is the Applicant's prior generation of friction stud welder described in the "Background of the Invention" of the Applicant's present application at paragraph 0004.

Murray and Couch, Underwater Friction Stud Welding for Military and Commercial Use, Underwater Magazine, pp. 18-22 (Jan./Feb. 2004). Refer to the entire article for general background defining the state of the art of underwater friction stud welding.

Murray, Underwater Friction Stud Welding, Association of Scientist and Engineers, 32nd Annual Technical Symposium, pp. 1-7 (Apr. 1995). Refer to the entire article for general background defining the state of the art of underwater friction stud welding.

\* cited by examiner

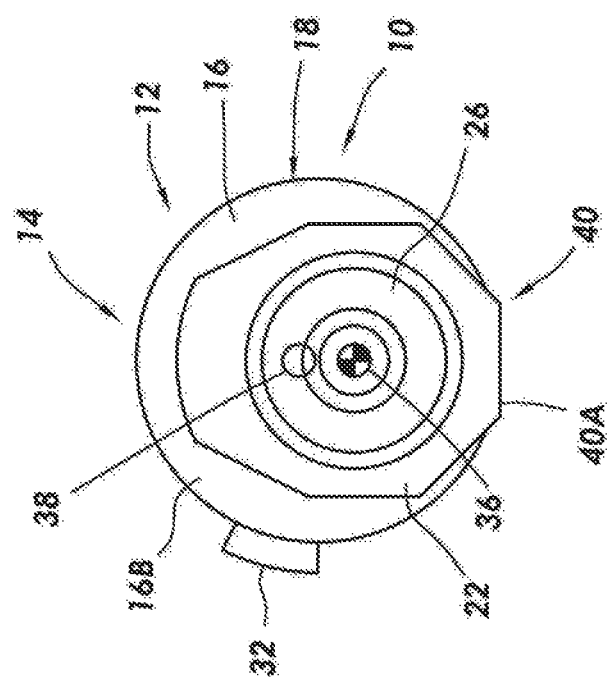
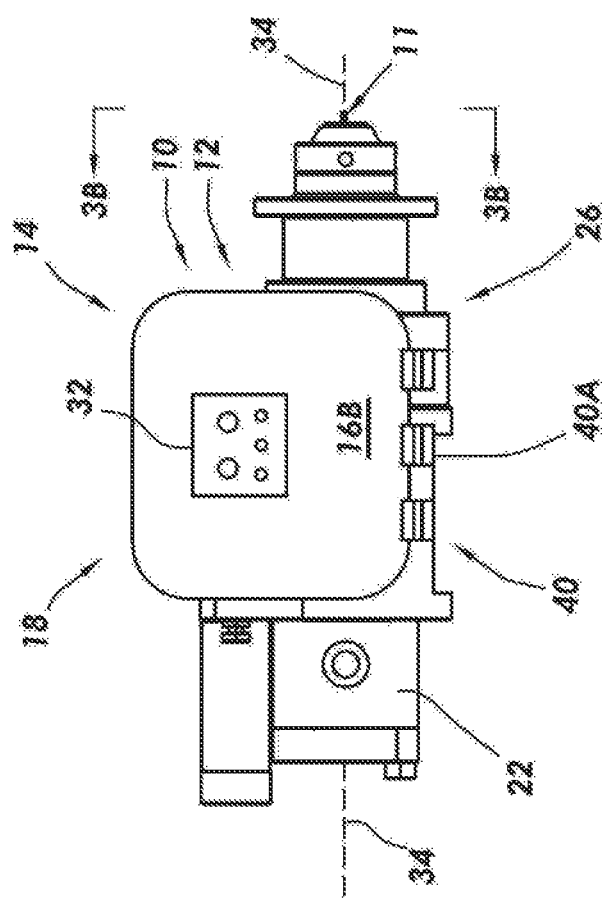
Fig. 3A
Fig. 3B

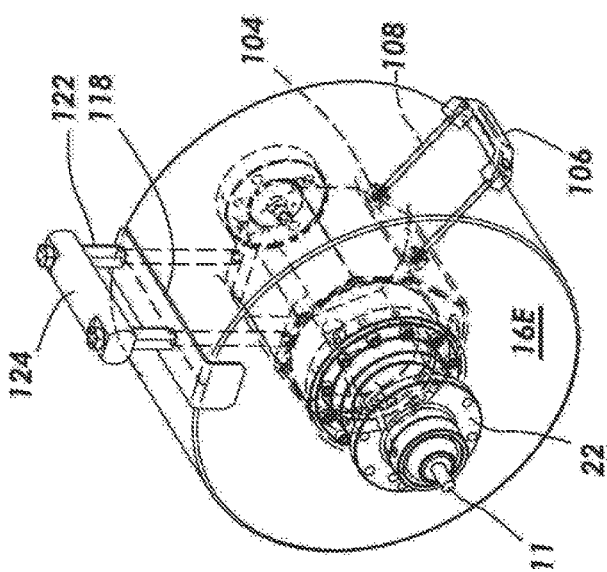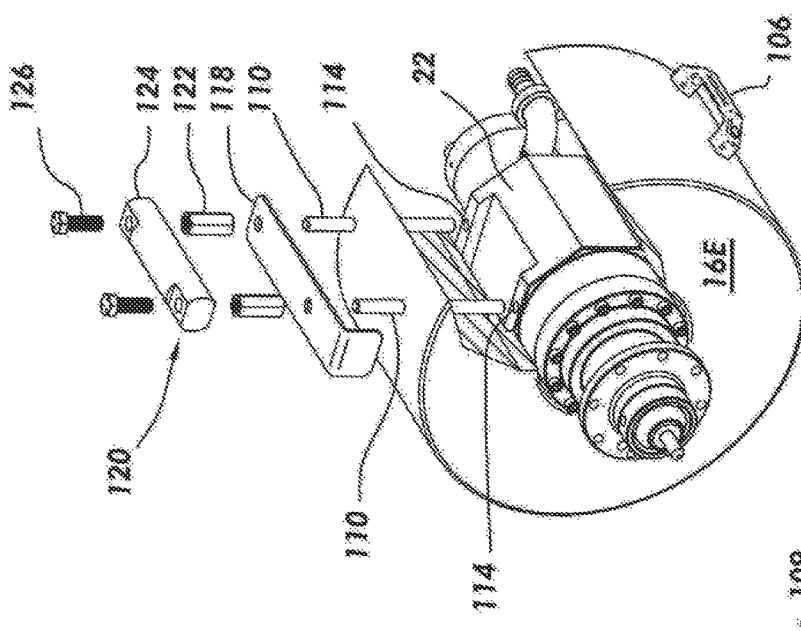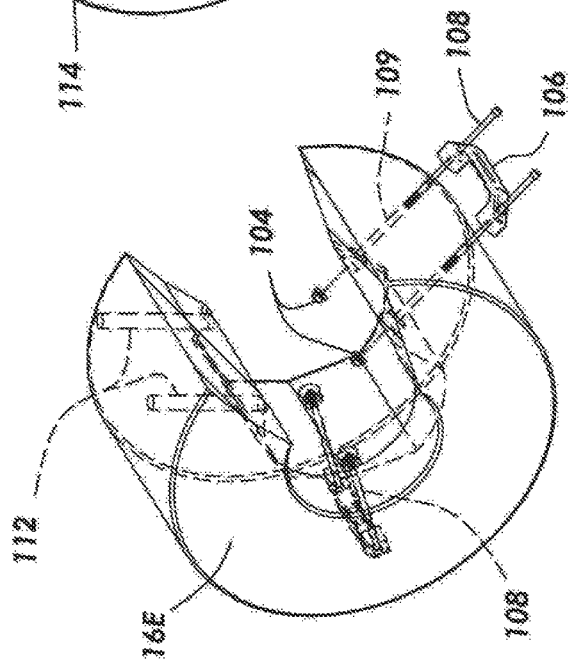
FIG. 20C
FIG. 20B
FIG. 20A

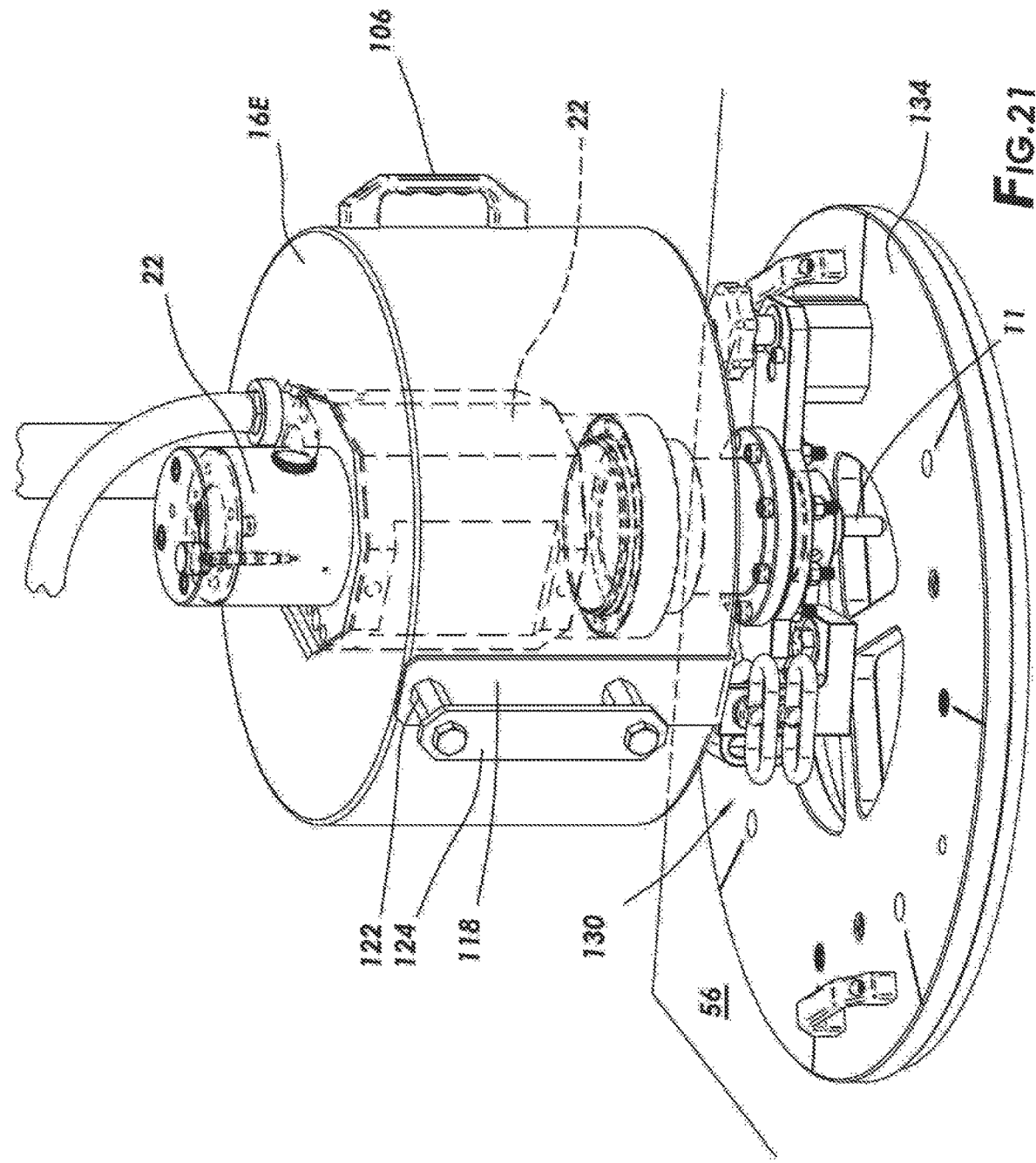

BUOYANCY PROVISIONS FOR FACILITATING UNDERWATER FRICTION WELDING

RELATED APPLICATIONS

This application claims the benefits of the filing dates of provisional applications: 1) Ser. No. 62/754,295, filed by Griffin et al on Nov. 1, 2018 for Buoyancy Provisions for Facilitating Underwater Friction Welding; 2) Ser. No. 62/881,340 filed by Lau et al on Jul. 31, 2019 for A Multi-Position Clamp for Friction Welding Operations; and 3) Ser. No. 62/881,366, filed by Lau et al on Aug. 1, 2019 for Buoyancy Provisions for Facilitating Underwater Friction Welding.

This application is a national phase entry under 35 USC 371 of International Patent Application No.: PCT/US2019/059155 filed 31 Oct. 2019.

BACKGROUND OF THE INVENTION

This invention relates generally to the field of portable friction welding and, more particularly, to a method and system for facilitating diver directed underwater portable friction welding.

Friction welding is a well-known industrial process for joining materials using a combination of pressure and friction induced heat from rotating a workpiece or fixture held against a substrate to which it is being joined. As friction welding can qualify as a "cold process," it is distinct from electric arc welding, acetylene torch welding, plasma welding or the like which are "hot" welding processes.

With reductions in size, advancements in power systems and enhancements in automation, portable friction welding systems have been developed allowing the benefits of friction welding to be deployed for repair and installation procedures in the field. There friction welding systems can efficiently and dependably install fixtures or workpieces such as studs (externally threaded projections) and bosses (internally threaded projections) even under some of the harshest of environments. Underwater applications such as external, below the waterline ship repair or underwater construction of dock components and the like are representative of one such harsh environment—subsea applications. In fact, the first generation of applicant's friction welding system passed the stringent requirements to qualify for use by US Navy divers. While this initial tool did represent a substantial improvement over the other options available for subsea use, the full measure of this improvement could be better realized with improved handling characteristics for divers. A dry weight of approximately 80 pounds in the tool and its attached clamp is cumbersome for divers having to wrestle equipment to place and use it. Even with the displacement offset, the largely metal design of this example presents an apparent underwater weight ("wet weight") in the neighborhood of 55 lbs. This is a challenging working weight in diving applications. So, despite the important advancements that friction provides over alternatives, this apparent weight in service presents challenges for the divers conducting repair and installation procedures using this equipment.

Therefore, there remains a substantial need for provisions facilitating ease of handling underwater in order for portable friction welding to best deliver its potential in this difficult environment.

BRIEF SUMMARY OF THE INVENTION

To achieve these and other advantages in accordance with the purposes of the present invention, as embodied and broadly described herein, the present invention relates, in part, to a method for facilitating diver directed friction welding operations with improved diver handling characteristics for a friction welding tool, said method comprising providing a buoyancy module and connecting the buoyancy module to the friction welding tool through an engagement. Combined, the friction welding tool and engaged buoyancy module form a portable friction welding tool system having less apparent underwater weight than the friction welding tool alone.

Another feature of the present invention is a buoyancy system for facilitating diver directed underwater joining operations using a portable friction welding tool having an attached clamp. Combined, the portable friction welding tool and the clamp present a combined center of gravity and a common longitudinal axis and are disposed to install one or more fixtures to a substrate. The buoyancy system comprises an engagement system removably securable to the portable friction welding tool with a center of buoyancy vertically aligned with the combined center of gravity for the friction welding tool and the attached clamp along the longitudinal axis of the tool. A buoyancy module is supportively connected to the engagement system.

A further feature of the present invention addresses a portable friction welding system with buoyancy provisions to facilitate underwater friction welding operations. The system has a power source and a portable friction welding tool operably connected to the power source. Often, a clamp system is secured to the portable friction welding tool to form a friction welding tool assembly and presents a combined center of gravity. An engagement system is provided which is removably securable to the portable friction welding tool assembly and a buoyancy module is supportively connected to the engagement system and presents a center of buoyancy.

Additional features and advantages of the present invention will be set forth in part in the description that follows and, in part, will be apparent upon study of the description or can be learned by practice of the invention. The features and other advantages of the present invention will be realized and attained by means of the elements and combinations particularly pointed out in the description and appended claims.

It is to be understood that both the foregoing general description and the following detailed description are exemplary and explanatory only and are intended to provide a further explanation of the present invention, as claimed.

BRIEF DESCRIPTION OF THE DRAWINGS

The accompanying drawings, winch are incorporated in and constitute a part of this application, illustrate features in various embodiments of the present invention and together with the description, serve to explain the principles of the present invention. The same items in different Figures are designated with the identical reference numerals and related items are often designated with the same reference numerals and with a letter suffix appended.

FIG. 3A is a side elevational view of an embodiment of the present invention deploying a saddle shaped buoyancy module;

FIG. 3B is an end view the embodiment of FIG. 3A taken from line 3B-3B of FIG. 3A and illustrating the saddle shaped buoyancy module wrapped around the friction welding tool;

FIG. 20A is a partially cross sectioned perspective view of a buoyancy module in accordance with the assembly of one embodiment of the present invention;

FIG. 20B is a partially cross sectioned, exploded perspective view of a buoyancy module and portable friction welding tool in accordance with one embodiment of the present invention;

FIG. 20C is a perspective view of an assembled buoyancy module and portable friction welding system in accordance with one embodiment of the present invention;

FIG. 21 is a perspective view of a buoyancy module in accordance with one embodiment of the present invention in the context of one embodiment of a portable friction welding system;

DETAILED DESCRIPTION OF THE INVENTION

Figures 1, 2:
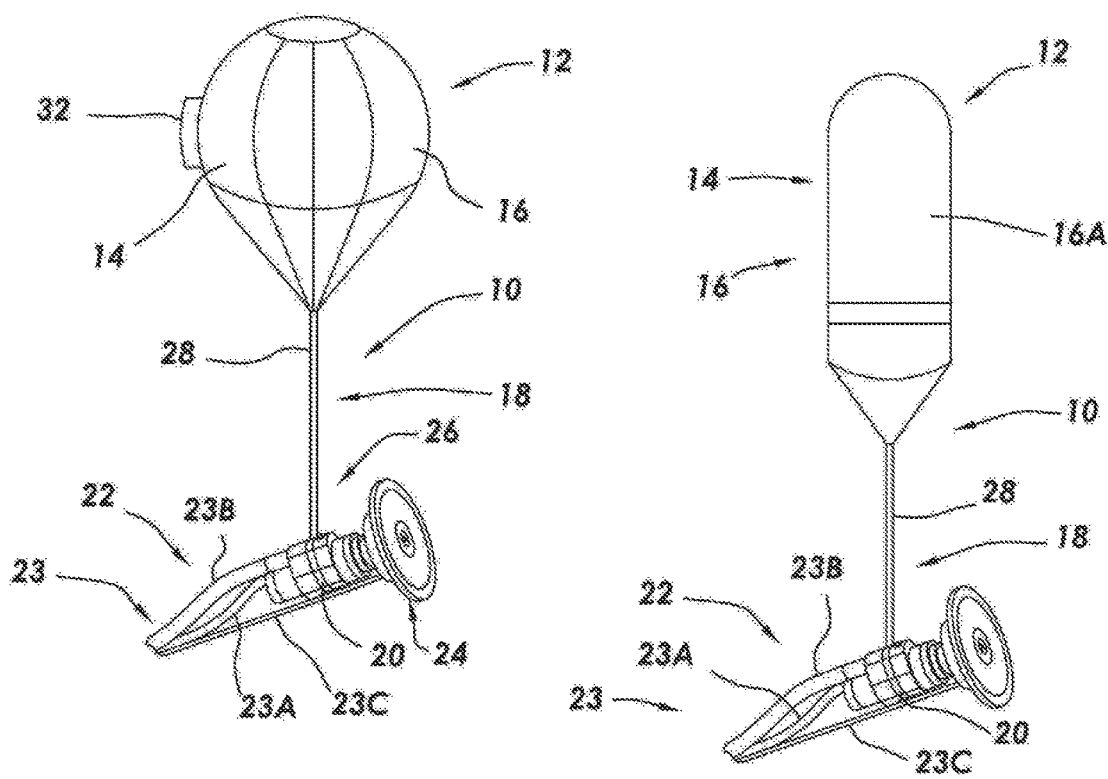
FIG. 1 is a perspective view of an embodiment of a buoyancy system for facilitating diver directed underwater joining operations using a portable friction welding tool having a buoyancy module comprising a compressible air bladder connected to the tool through a tether.
FIG. 2 is a perspective view of an alternate embodiment of a buoyancy system for facilitating diver directed underwater joining operations deploying a hard-shell buoyancy module.

FIG. 1 is a side elevational view of a portable friction welding system 10 including buoyancy provisions 12 which comprises a buoyance module 14 and an engagement system 18. In this embodiment, buoyancy module 14 is provided by an air bladder 16 and the engagement system 18 can be provided by a harness or collar 20 encircled about the periphery of friction welding tool 22, here illustrated schematically. The friction welding tool is often supplied with an attached clamp 24. Friction welding tool 22 and clamp 24 are referred to herein as friction welding tool assembly 26. In addition to the friction welding tool assembly, portable friction welding system 10 comprises other components including a power source (pneumatic, hydraulic or electrical sources conveniently located on the surface), power transmission means such as a cord or hose 23 and, in some embodiments, a driver for clamp engagement, e.g., a vacuum pump. Cord or hose 23 should be considered as part of the assembly if it is not substantially buoyant neutral. In a pneumatic system, hose 23 may conveniently be provided by an umbilical bundle of an air supply 23A, and exhaust line 23B and a vacuum line 23C. Friction welding tool assemblies are discussed in greater detail in U.S. Pat. No. 5,699,952 issued to Fix on Dec. 23, 1997 for an Automated Friction Bonding Apparatus and U.S. Pat. No. 5,735,477 issued to Fix on Apr. 7, 1998 for a Friction Welding Apparatus, the disclosures of which are hereby incorporated by reference.

In FIG. 1, friction welding tool assembly 26 is connected to buoyancy module 14 through engagement system 18 comprising a suspension cable or tether 28 and a collar 20.

Subsea service is a particularly demanding environment when conducted in the vicinity of other structures and surfaces. Thus, while air bladder 16 may be configured from natural or synthetic rubber, vinyl or other materials with low air permeability, it may prove important to layer a low permeability membrane inside tougher materials or to cover the air bladder with materials offering greater puncture and abrasion resistance such as Kevlar or ballistic nylon. Such materials will also facilitate attaching tether 28 to the air bladder.

A similar embodiment is illustrated in FIG. 2. In this example, friction welding tool 22 is supported through collar 20 and tether 28 from buoyancy module 14. However, the buoyancy module 14 of this example is a sealed, hard-shell vessel 16A. This provides good resistance to puncture and abrasion failure, but if sealed may fail under increasing water pressure on descent in the water column as the outside pressure is not offset by pressure from air trapped inside. This pressure imbalance may crush the hard-shell vessel 16A in deeper service.

By contrast, in FIG. 1 the displacement volume of the air inside the bladder compresses as it descends through the water column and air bladder 16 loses volume. The stress on the air bladder is mitigated as equilibrium is maintained between the inside and outside of the air bladder. However, the reduction in displacement volume in the air bladder with increasing depth means an ever-decreasing amount of buoyancy as friction welding tool assembly 26 is brought deeper. A similar situation is involved if an unsealed hard-shell buoyancy module is deployed and the trapped air is compressed as the water line rises inside the hard-side vessel and the pressure balances.

Scuba divers have used flotation vests which allows air to be added or released in response to changes of the depth as a means to maintain balance. This may be done manually or automatically in response to changes in depth. For instance, AiCT provides a proprietary solution to automatically adjust the volume in an air bladder within a diver's vest in response to changes in depth adaptable to our application. Control 32 provides a similar depth compensating adjustment system in FIG. 1. Whether manual or automatic, it will need a feed, e.g. as a tap from hose 23 leading to the pneumatic system driving friction welding tool 22. Alternatively, another source of pressurized air may be provided on site or conducted from the surface through a hose bundled to the pneumatic, hydraulic or electrical power being brought to drive the friction welding tool.

In other illustrative examples, buoyancy module 14 may be formed of syntactic foam with the benefits set out in the discussion of FIGS. 2A, 4-17, 20A-20C, 21, 22A, 22B, 23A, and 23B below.

Figure 2A:
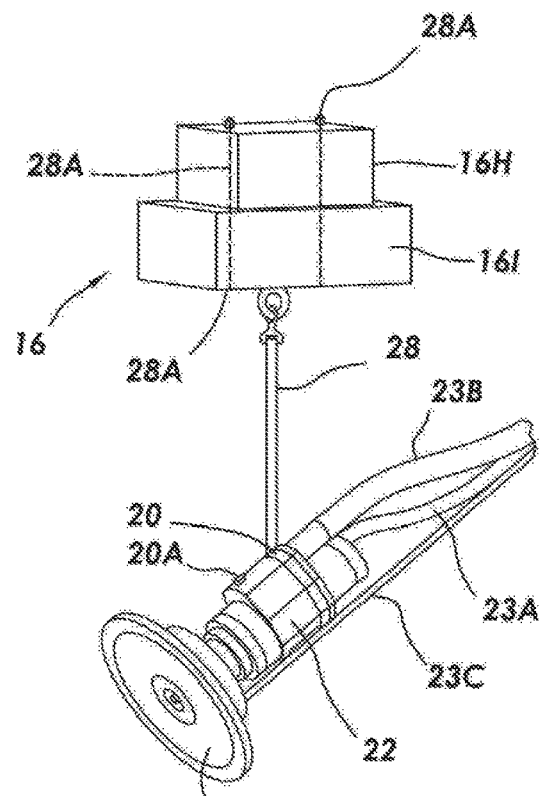
FIG. 2A is a perspective view of an alternate embodiment of a buoyancy system for facilitating diver directed underwater joining operations deploying a syntactic foam suspension system.

FIG. 2A illustrate the use of multiple modules of syntactic foam, here represented by modules 16H and 16I, that may be added and secured together with through bolts 28A to adjust to the total weight of the system here tool 22, clamp 24 and the net effect of lines 23A, 23B and 23C. It will be appreciated that deploying other accessories will result in a need for different total buoyancy and that syntactic foam modules may be made available to match each accessory and can be combined as necessary. FIG. 2A also illustrate adjusting the trim of the combined tool and clamp assembly by where on the tool connection 20 is attached to tether 28. For example, here the connection is moved back and the tool points downward. By contrast, connecting instead at connection point 20A results in an upward pointing tool 22 and a more horizontal trim is available between these connection points.

The buoyancy provisions of FIGS. 1, 2 and 2A can effectively provide divers with a friction welding system having neutral buoyancy or at least a reduced apparent weight. However, working requirements for underwater friction welding will seldom involve long free-swimming situations and may frequently involve working on the underside of substantially horizontal surfaces where the vertically oriented buoyancy module/tether/friction welding tool arrangement is problematic.

FIGS. 3A and 3B illustrate another portable friction welding system 10 in an alternate embodiment for buoyancy provisions 12 to a friction welding tool assembly 26 (here clamp 24 has been omitted from the drawings for the purposes of clarity). In this embodiment, the vertical orientation of embodiments illustrated by FIGS. 1 and 2 has been replaced with buoyancy module 14 secured closely to the outside of friction welding tool 22. Here buoyancy system 12 is provided by module 14 which is here in the shape of a saddle 16B and engagement system 18 is provided by wrapping saddle 16B of buoyancy module 14 circumferentially around friction welding tool assembly 26 and securing the bottom ends of saddle 16B beneath tool. Allowing this engagement to sling in straps can seat friction welding tool assembly 26 such that its combined center of gravity 36 is separated from the center of buoyancy 38 for saddle 16B. See FIG. 3B. This provides the combined buoyancy/tool unit with a preferred orientation, i.e., it will tend to roll to an orientation with center of gravity 36 disposed directly beneath center of buoyancy 38. Further, greater separation develops greater hydrostatic stiffness, e.g., resistance to rotation about longitudinal axis 34. Multiple straps 40A in attachment system 40 is one way to secure this low-slung orientation. Alternatively, attachment system 40 could attach the sides of saddle 16B directly to the friction welding tool assembly. This bias to maintain rotational orientation can be particularly helpful to divers in low visibility situations such as when silt renders the water opaque and places the diver in a total visual blackout. Having a standard orientation will be helpful in locating and operating the right controls in the process of making the joints in such conditions.

In this particular illustrative embodiment, a buoyancy module 14 is provided in the form of a saddle 16B including an air bladder 16, which again may be of a layered construction or covered by a separate puncture and abrasion resistance material. Alternatively, buoyancy module 14 may comprise a hard-shell vessel as discussed above or syntactic foam as discussed below. Should an air bladder be used, applications may be assisted with the provisions for depth adjusting compensation such as system 32 with the same feed options discussed with FIG. 1 above.

Turning to the embodiment of the present invention illustrated in FIGS. 4-7, this buoyancy module 14 is fabricated out of syntactic foam 42 which provides an alternative to an air bladder or a hard-shell vessel in the illustrative examples described above. Syntactic foam deploys high strength, substantially water impervious hollow spheres in an aggregate joined by a binding agent. For instance, these closed cells are commonly made of glass, ceramic or preformed polymer spheres which are bound together by a polymer base. This produces a high strength, low density material which is resistant to both great hydrostatic pressure and long-term water exposure—a combination of attributes well-suited to subsea buoyancy applications.

Figure 5:
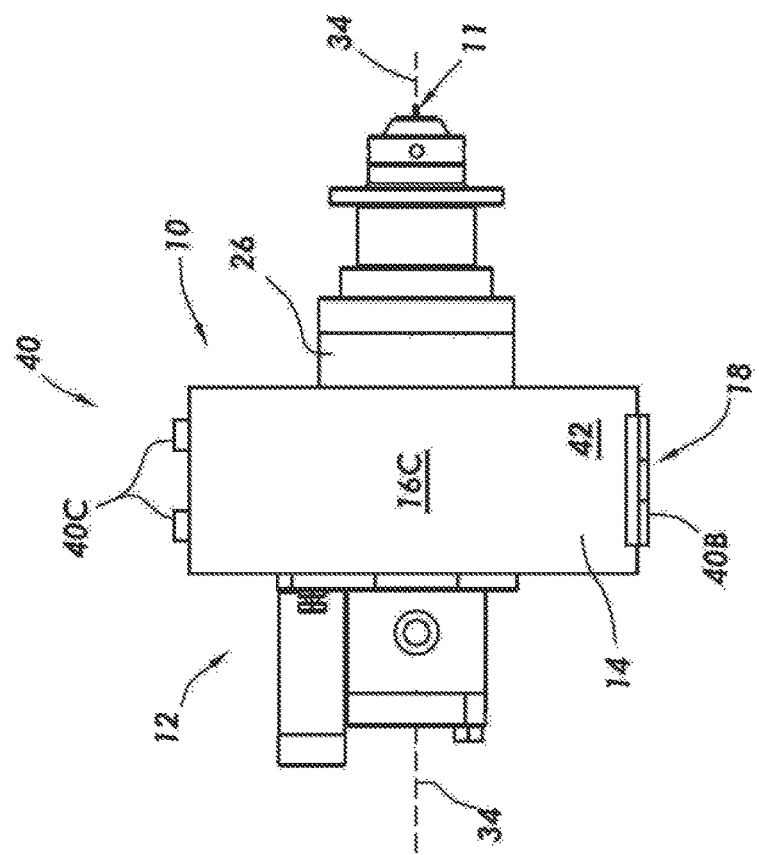
FIG. 5 as a side elevational view of the embodiment of FIG. 4 taken from a line 5-5 in FIG. 4.
Figure 4:
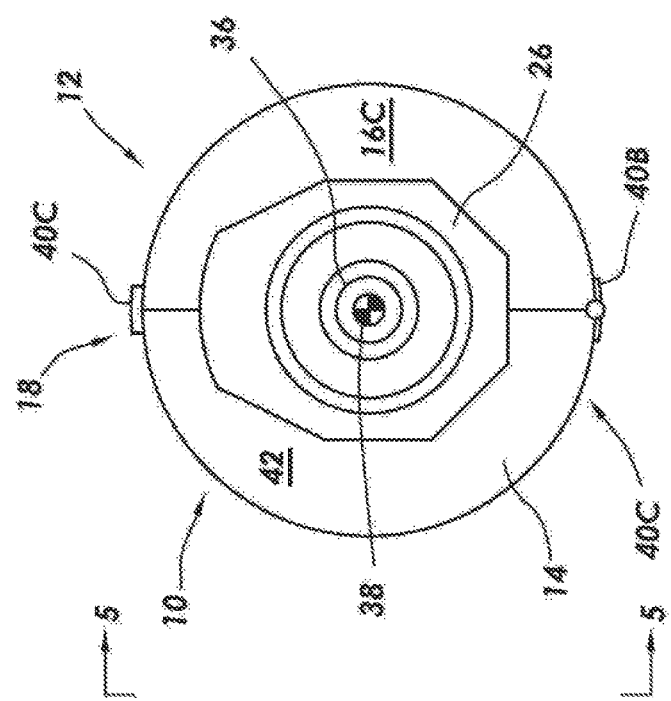
FIG. 4 is an end view of an embodiment of the present invention deploying a donut shaped buoyancy module encircling a friction welding tool.
Figure 7:
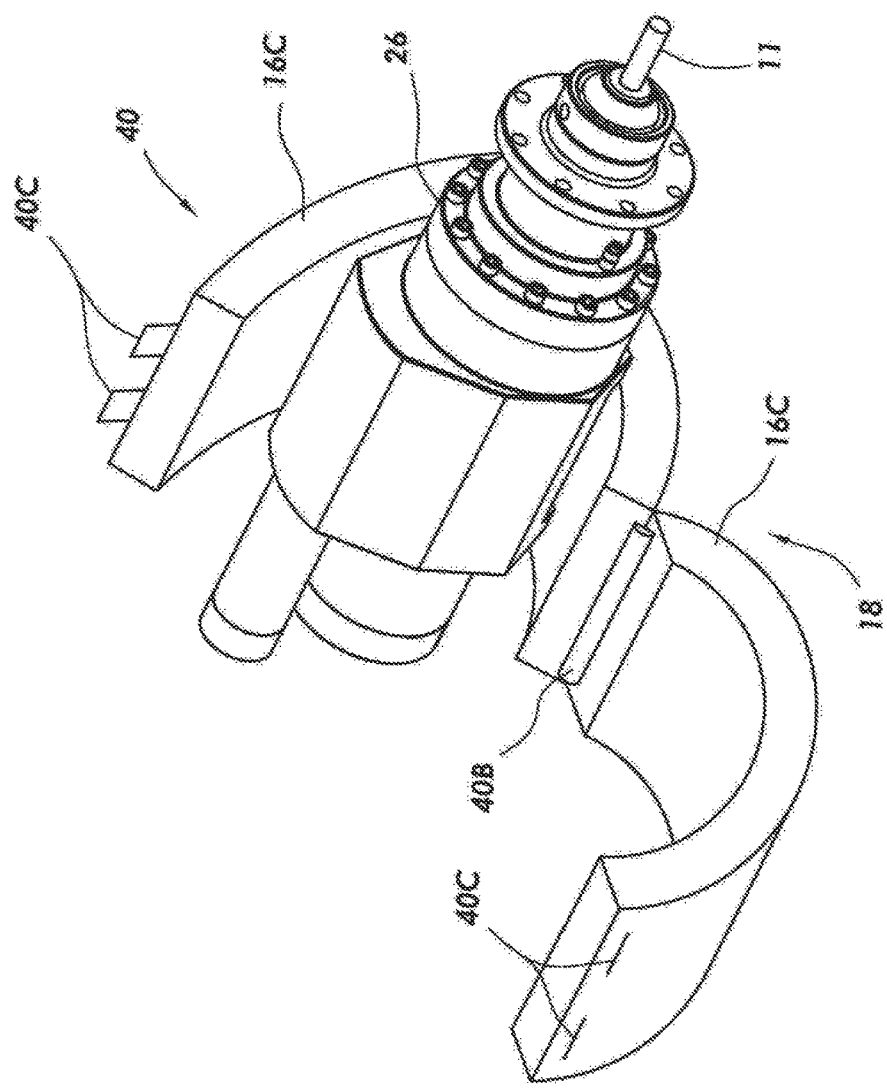
FIG. 7 is a perspective view of a clam-shell deployment of the buoyancy module of FIGS. 4, 5, and 6.
Figure 6:
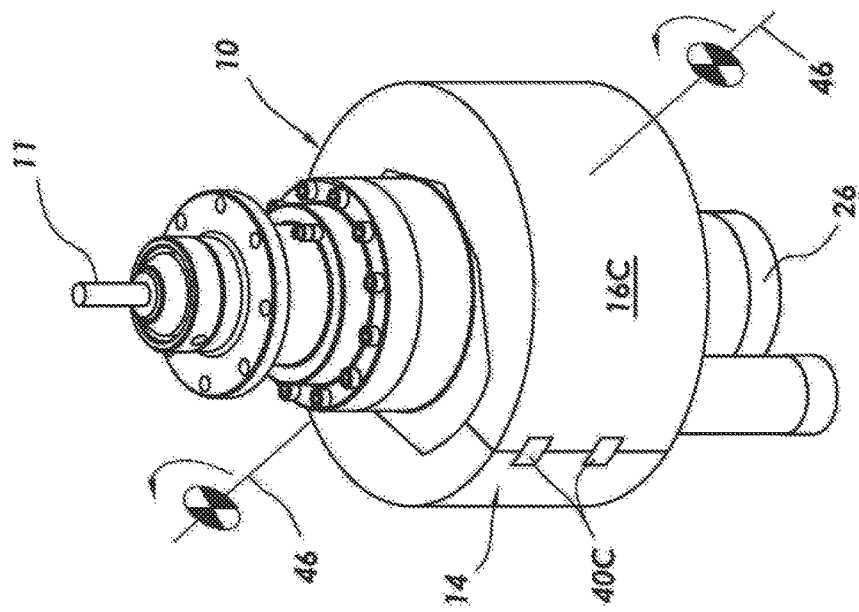
FIG. 6 is a perspective view of the embodiment of FIGS. 4 and 5.

FIG. 4 is an end view of portable friction welding system 10 with buoyancy system 12 in which buoyancy module 14 as provided in the form of a donut shaped float provided here as syntactic foam assembly 16C wrapped concentrically about the periphery of friction welding tool assembly 26. FIG. 5 is a side elevational view and FIG. 6 is a perspective view of the same embodiment. In these illustrations, donut shaped syntactic foam assembly 16C wraps about the periphery of friction welding tool assembly 26 with engagement system 18 further comprising attachment system 40 which is provided by hinge 40B and one or more latches 40C. Refer to the clam-shell installation illustrated in FIG. 7 which is facilitated by the hinge and latches. Alternatively, bolts, straps, or other hardware can hold the ends of assembly 16C together, taking advantage of this clam-shell configuration for engagement for ease of installation in a secure, yet easily removable, engagement system 18 of syntactic foam assemblies 16C secured about friction welding tool assembly 26. Further, the embodiment of FIGS. 4-7 place center of buoyancy 38 for buoyancy module 14 at the center of gravity 36 for the friction welding tool assembly 26 which is also aligned with longitudinal axis 34 for friction welding tool system 10. And referring to FIG. 6, this configuration offers little resistance to rotating the friction welding tool system in a vertical plane about axis 46. This facilitates rotation to install fixtures to an overhead surface or one below, as well as a substantially vertical surfaces and anything in-between.

Figure 9:
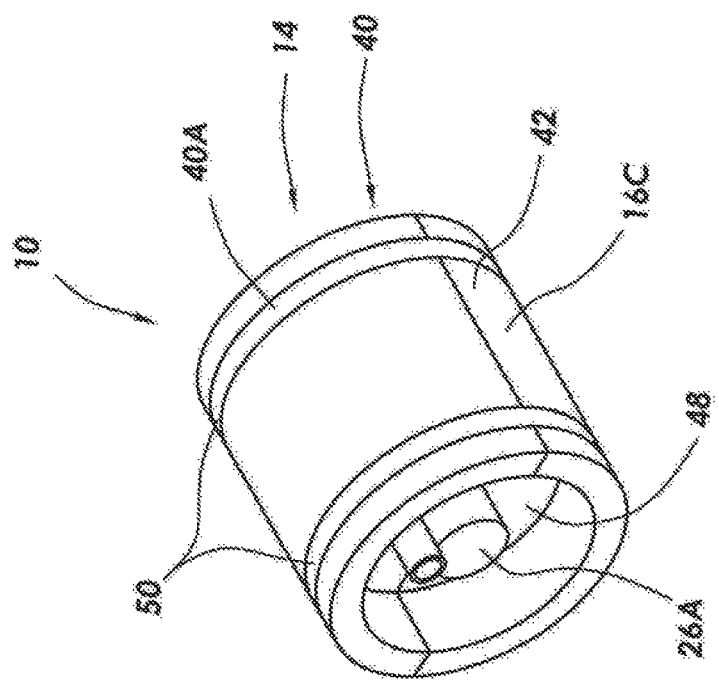
FIG. 9 is a perspective view of the embodiment FIG. 8.
Figure 8:
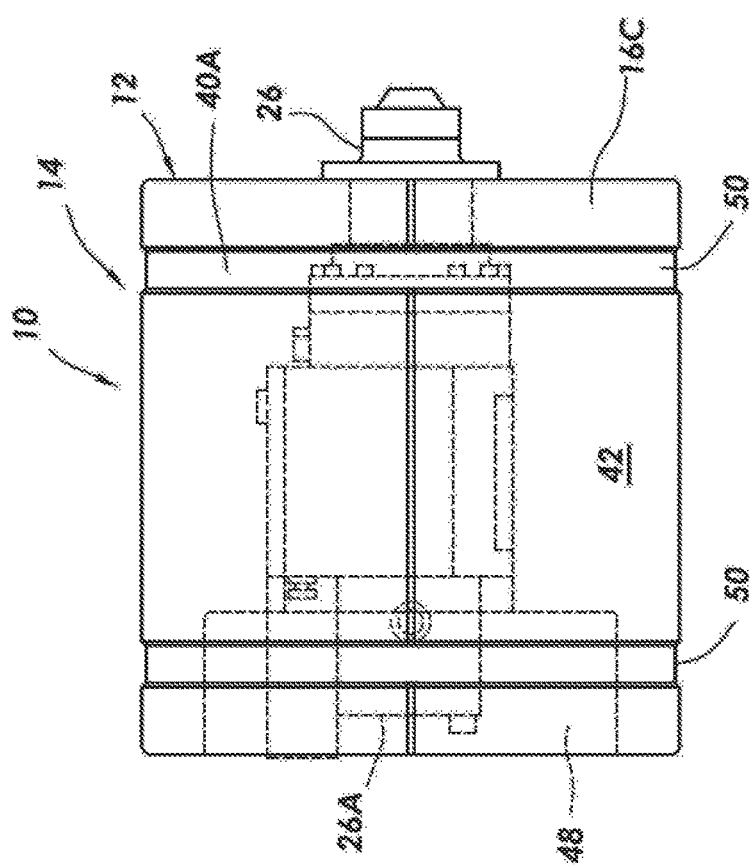
FIG. 8 as a side elevational view of an alternate embodiment of a buoyancy system in accordance with the present invention circumferentially mounted about the body of a friction welding tool.

FIGS. 8 and 9 illustrate an alternate embodiment of portable friction welding tool system 10 also deploying an encircling buoyancy system 12. In this view, buoyancy module 14 in the form of syntactic foam assembly 16C has been given substantial transparency (in dotted line outline) for the purposes of illustration. Again, the clamp has been removed from friction welding tool assembly 26A for the purpose of clarity. Here, syntactic foam assembly 16C axially spreads over more of friction welding tool assembly 26A than in the donut configuration schematically illustrated in FIGS. 4-7. Extending beyond the back of the tool, a cavity or recess 48 is provided to facilitate diver access to control panel 24 of friction welding tool assembly 26A. Again, syntactic foam assembly 16C is provided by two pieces which are secured by attachment system 40 to surround the circumference of friction welding tool 26A. Here attachment system 40 for securing syntactic foam assembly 16C includes recessed tracks 50 for receiving encircling straps to hold the two-piece syntactic foam assembly 16C in place. Straps 40A (not shown in this Figure for the purposes of clarity) may be an alternative or supplement to hinge 40B or latches 40C as illustrated in the embodiment FIGS. 4-7. Such straps provide an opportunity to assist handling with attachments for lift lines and convenient grips for divers.

Figure 11:
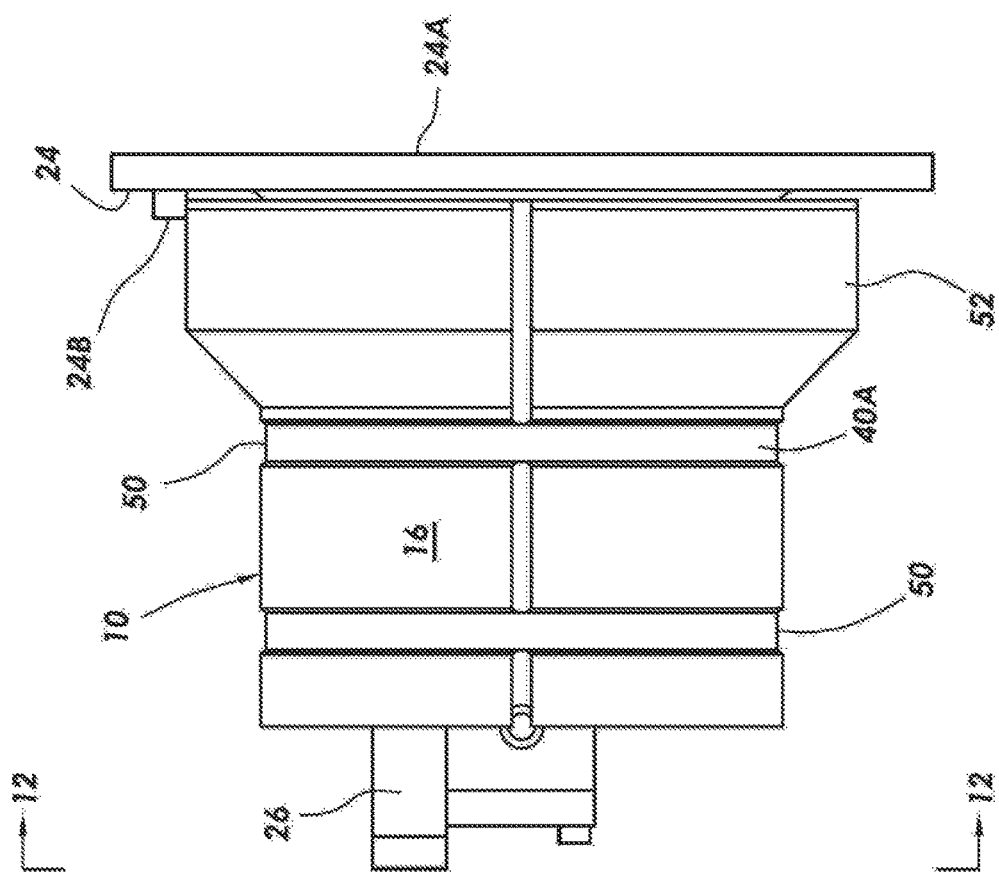
FIG. 11 is a side elevational view of the embodiment of FIG. 10.
Figure 10:
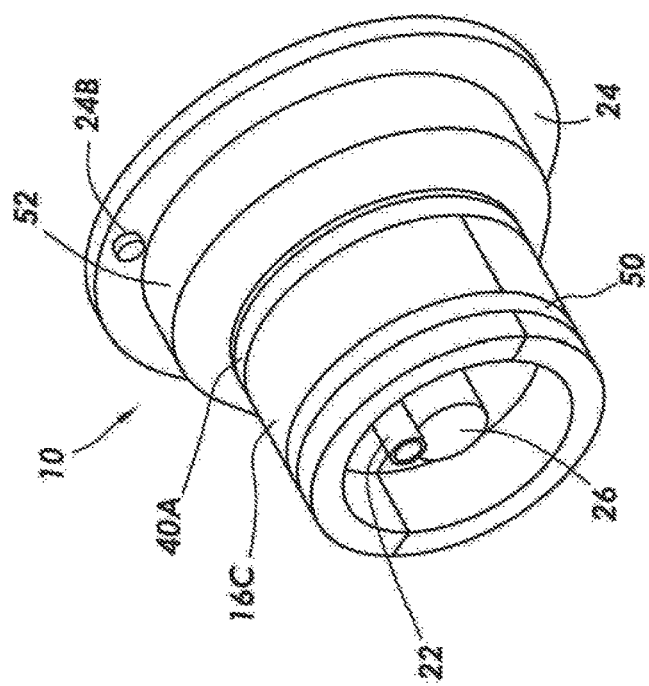
FIG. 10 is a perspective view of yet another embodiment of a buoyancy system in accordance with the present invention in which a clamp is shown in place at the end of the friction welding tool.

FIGS. 10-13 illustrate another embodiment of the present invention. Friction welding tool assembly 26 is illustrated with clamp 24 in place. Here clamp 24 presents a large concave surface, the distal outer edge 24A of which is provided with seal and connected to a system to draw a vacuum securing the distal face of clamp 24 into secure engagement against a substrate (see, e.g., substrate 56 in FIGS. 16 and 17) to which a fixture (see, e.g., fixture 11 of FIGS. 3A and 7) will be joined. Controls 24B are illustrated schematically and receive a hose, not shown, for establishing and terminating the vacuum. Making the clamp controls accessible from the side of friction welding tool system 10 potentially places the diver operator in a better position to view clearly the fixture placement as the clamp is seated. Those having ordinary skill in the art will appreciate that clamp 24 may be adjusted in size, shape and form without departing from scope of the present invention and may hold through mechanical or other means besides a vacuum seal, including but not limited to, straps, chains, c-clamps, magnetic, etc. Alternatively, clamp 24 may be provided as a separate element and first secured to the substrate and then connected to friction welding tool 22. However, in this embodiment clamp 24 travels with friction welding tool 22 in friction welding tool assembly 26 and presents considerable loading at the distal end of the fusion bond tool assembly which needs to be offset with a supplemented region 52 of syntactic foam assembly 16C for the combined portable friction welding system 10 to ride in horizontal trim. FIGS. 10 and 11 substantially align the center of gravity and longitudinal axis for friction welding tool assembly 26 and the center of buoyancy for buoyancy module 14. As a result, this friction welding tool assembly 26 would exhibit low hydrostatic "stiffness", both to roll about the common longitudinal axis and to pitch in a vertical plan. This facilitates diver articulated translation from horizontal trim to a vertical orientation.

Figure 12:
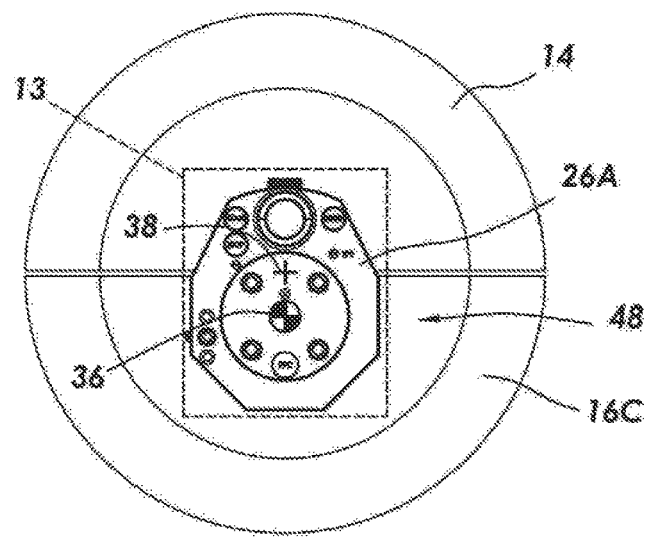
FIG. 12 as a modification illustrated to the end view of the embodiment of FIG. 11 taken along line 12-12 in FIG. 10.
Figure 13:
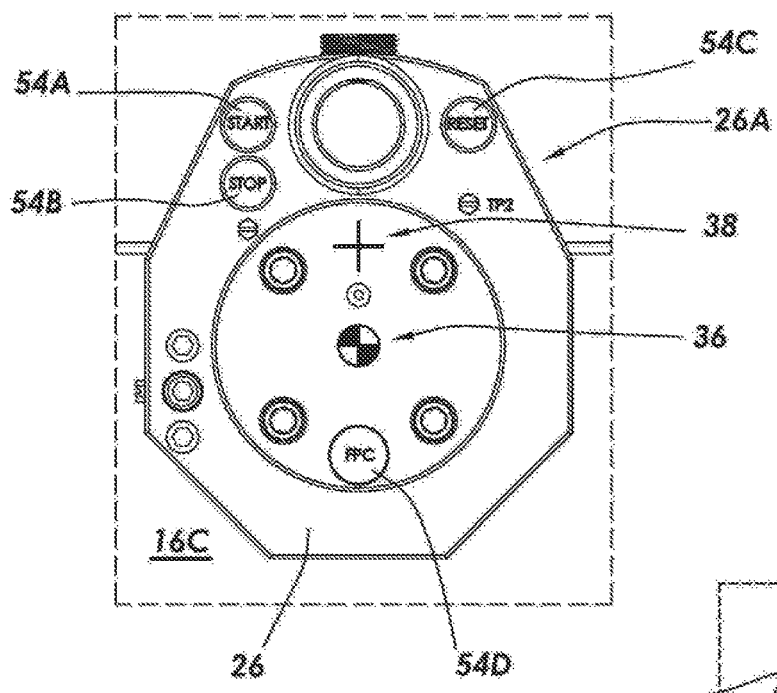
FIG. 13 is a close-up of the diver accessible controls in the embodiment of FIG. 12.
Figure 14:
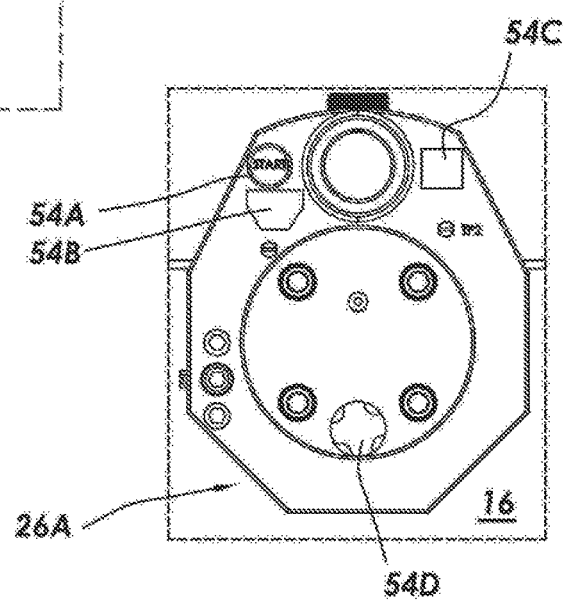
FIG. 14 illustrates an end view and close-up of an alternate embodiment in which the diver controls have tactilely distinguishable controls.

FIG. 12 is generally the embodiment of FIG. 10, but with one change—the center of gravity 36 and the center of buoyancy 38 have been distanced. FIG. 12 is an end view of combined portable friction welding system 10 looking at the control panel 26A presented in recess 48 in syntactic foam assembly 16C and FIG. 13 is an enlargement of control panel 26A presented on the end of friction welding tool assembly 26. Similar to the embodiment of FIGS. 3A-3B, the portable fusion body system of FIG. 12 presents a center of gravity 36 for friction welding tool assembly 26 position below center of buoyancy 38 for buoyancy module 14 presenting syntactic foam assembly 16C. This affords portable friction welding system 10 with a bias to ride "upright" to maintain orientation and thereby facilitate the operator's use of controls and low visibility situations. In this illustrative embodiment, control panel 26A presents buttons and/or knobs to start, stop, reset and an IPC control, here designated 54A, 54B, 54C and 54D, respectively. Refer to the enlargement of FIG. 13. FIG. 14 presents an alternate embodiment of control panel 26A in which controls to start 54A, stop 54B, reset 54C and control IPC 54D are distinctively shaped to facilitate tactile identification, even wearing gloves. In this example they are round, triangular, square and cross shaped, respectively. Divers will find this particularly helpful in friction welding tool systems 10 having low hydrostatic stiffness.

Figure 15:
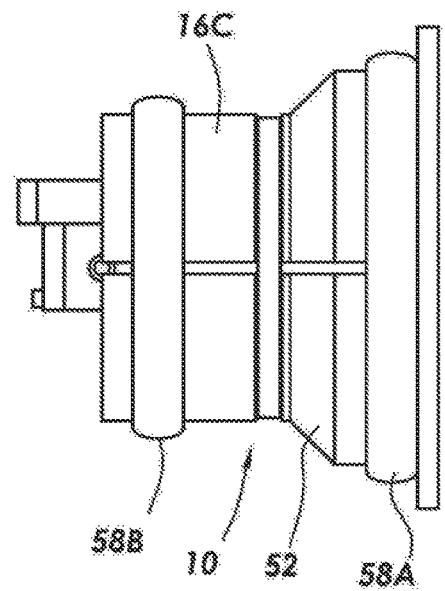
FIG. 15 is a side elevational view of an embodiment of the present invention in which provisions are made to move the center of buoyancy to facilitate rotating the friction welding tool assembly in a vertical plane, starting from a horizontal orientation.
Figure 16:
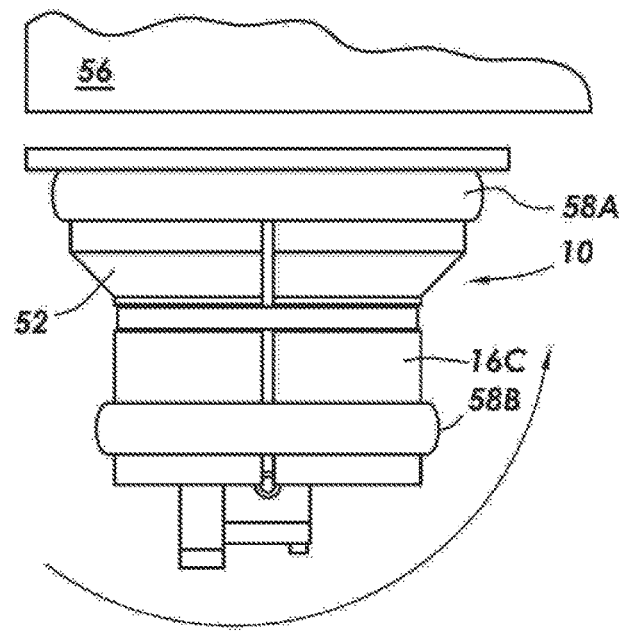
FIG. 16 is a side elevational view of the embodiment of FIG. 15 in which the distal end of the friction welding tool assembly is oriented upwards.
Figure 17:
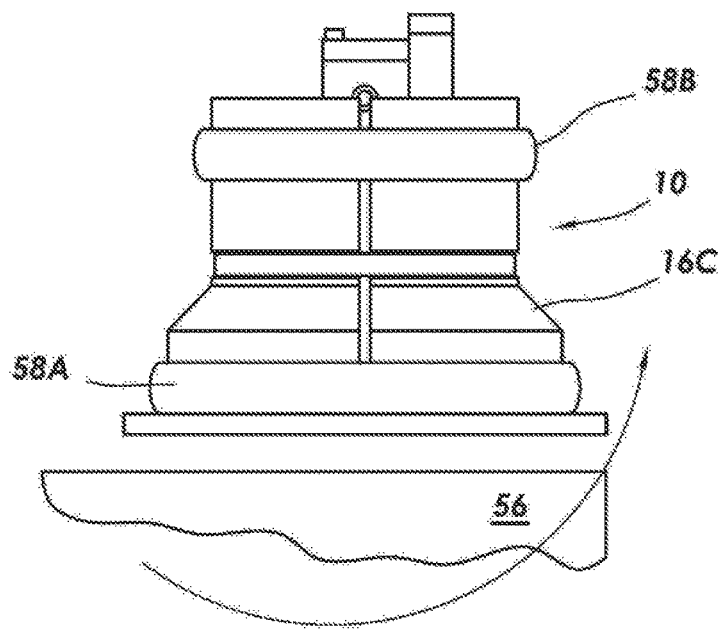
FIG. 17 is a side elevational view of the embodiment of FIG. 15 in which the distal end of the friction welding tool assembly is oriented downwards.

FIGS. 15-17 illustrate the addition of provisions to assist in up-ending a portable a fusion of bonding system 10 having a significant hydrostatic stiffness, i.e., biased for horizontal trim as is illustrated FIG. 15. This bias must be overcome in order to tilt this system upwards as in FIG. 16 to engage an overhead substrate 56 such as the bottom of the ship hull or to tilt downward is in FIG. 17 to approach substrate 56 from above. The "stiffness" resisting rotating portable friction welding system 10 in a vertical plane to make such approaches may be mitigated with an active system to assist divers in this translation. Here auxiliary buoyancy system 58A and 58B encircle friction welding tool system 10 at the extreme ends. Connected to an air source, air bladders in auxiliary buoyancy systems 58A and 58B may be selectively inflated. In FIG. 15 both auxiliary buoyancy systems 58A and 58B are uninflated. By contrast, in FIG. 16 auxiliary buoyancy system 58A has been inflated, upending friction welding tool system 10 to approach substrate 56 from beneath. A net positive buoyant force is actually an advantage is this application. However, a net positive buoyant force presents a problem in the application of FIG. 17 in which friction welding tool system 10 translates to point downwardly and engage substrate 56 below. In such applications it may be desirable to underbalance the buoyancy of syntactic foam 16C such that an assist and balance from auxiliary buoyancy systems 58A and 58B is required for horizontal trim and neutral buoyancy. Upending whether to engage substrate surface 56 above as in FIG. 16 or a substrate surface 56 below as in FIG. 17 may then be accomplished by changing the relative contributions from auxiliary buoyancy systems 58A and 58B. This may be accomplished by moving air or ballast between the systems or adjusting each individually. Of course, supplementing the underbalanced buoyancy of syntactic foam with air in a soft sided air bladder raises the issues discussed above for depth adjustments. However, a hard-shell system in which entrance of sea water is selectively allowed or purged for translation can avoid this.

Alternatively, the connection point for ballast may be shifted along the longitudinal axis, e.g., by sliding a weight along a rail 202 (see FIGS. 22A and 22B) or along a track 200 (see FIGS. 23A and 23B) disposed parallel to and below the longitudinal axis of friction welding tool assembly 26 and securing the weight, e.g., using locking grip nuts 214, at a desired location selected to better accommodate a facilitating trim. Or buoyancy may be otherwise shifted, e.g., moving one or more supplementary buoyancy modules 16G in a track 200 or along on a rail 204 or by making all or a portion of the syntactic foam 52 slidable along the longitudinal axis for lock down at a position to better accommodate the trim desired for a given application.

Figure 22A:
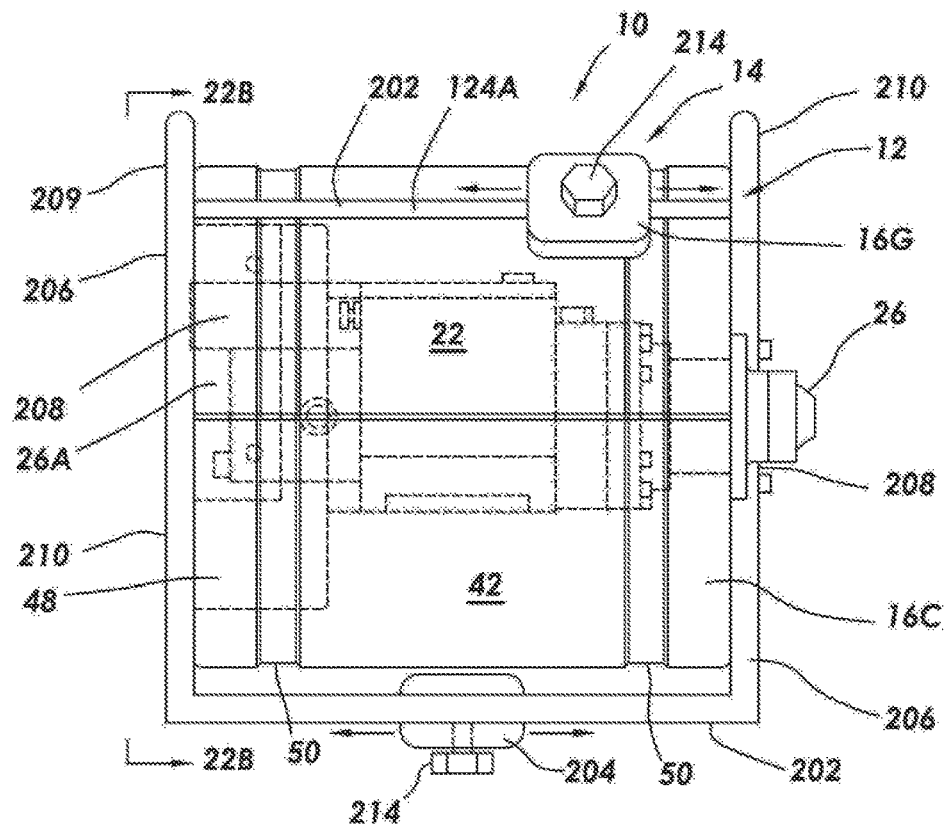
FIG. 22A is a side elevational view of a buoyancy module in accordance with one embodiment of the present invention illustrating adjustable rail mounted ballast and supplemental buoyancy modules.
Figure 22B:
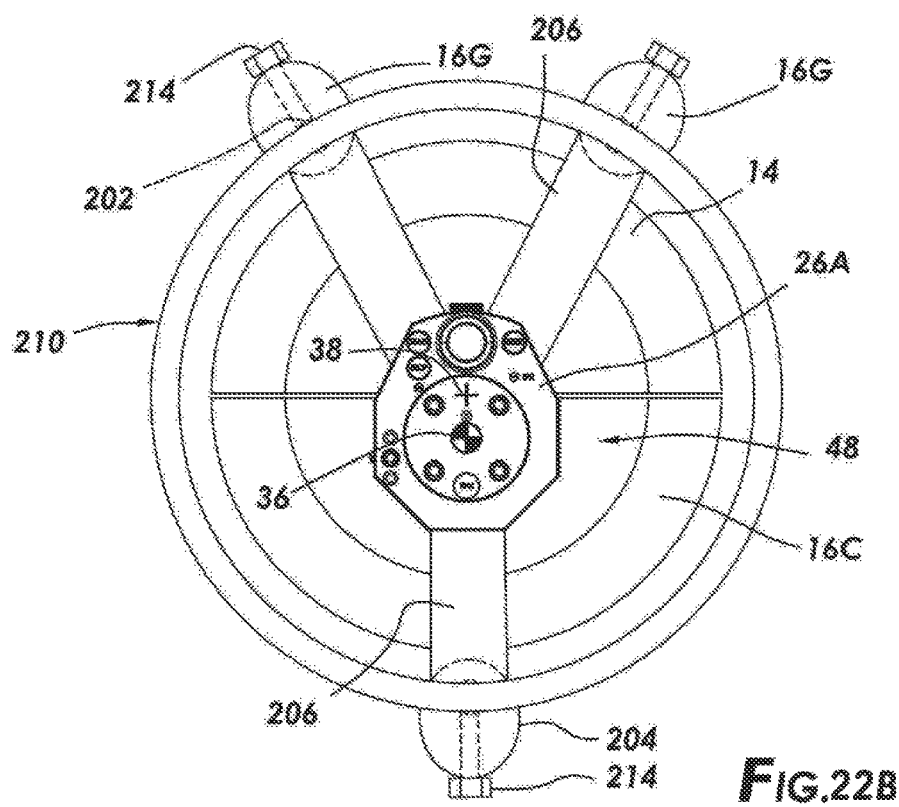
FIG. 22B is an end view of the buoyancy module of FIG. 22A taken at line 22B-22B in FIG. 22A.
Figure 23A:
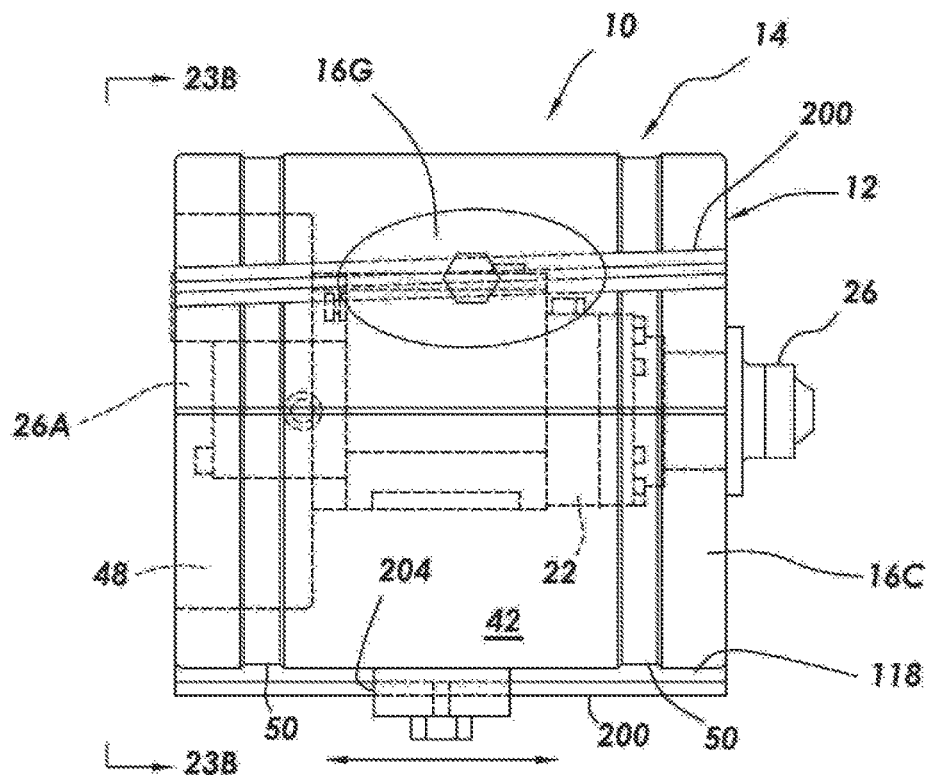
FIG. 23A is a side elevational view of a buoyancy module in accordance with one embodiment of the present invention illustrating adjustable track mounted ballast and supplemental buoyancy modules.
Figure 23B:
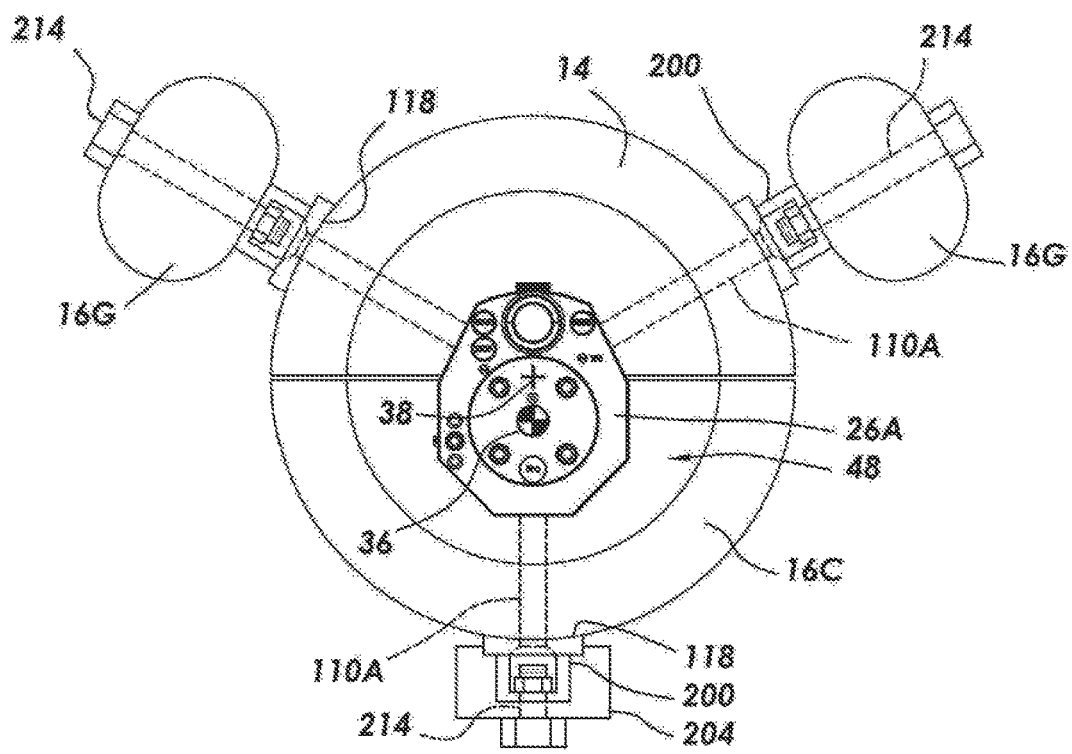
FIG. 23B is an end view of the buoyancy module of FIG. 23A taken at line 23B-23B in FIG. 23A.

In FIGS. 22A and 22B, spokes 206 emanate from a hub 208 connected to portable friction welding tool 22 and can help to contain the syntactic foam buoyancy module. A pair of rims 209 and 210 connect the spokes together and extend longitudinal handles 124A which connect the forward and rearward rims and serve as rails 202 for weights 204 and/or supplementary buoyancy modules 16G, singularly or in combination. The rims and rails also serve as handles and roll-cage protection for the portable friction welding tool. In FIGS. 23A and 23B, adjustment of trim along the longitudinal axis of the tool 22 is accomplished by positioning weights 204 and supplementary buoyancy modules 16G, singularly or in combination, slidingly mount in tracks 200 where they can be fixed at desired locations through tightening grip bolts 214. In this illustrative embodiment the tracks are mounted along foam retaining straps 118 which are secured to tool 22 through syntactic foam 16C with treaded bars 110A similar to the handle mounting procedure discussed in connection with FIGS. 20A-20C, discussed below.

Although the buoyancy module 14 of FIGS. 22A, 22B, 23A and 23B is illustrated with a clam-shell syntactic foam assembly 16C, it will be appreciated that these track and rail systems may be deployed with other configurations of buoyancy modules, including, without limitation, hard-shell or one piece syntactic foam, and any other illustrated form of buoyancy module.

Figure 18:
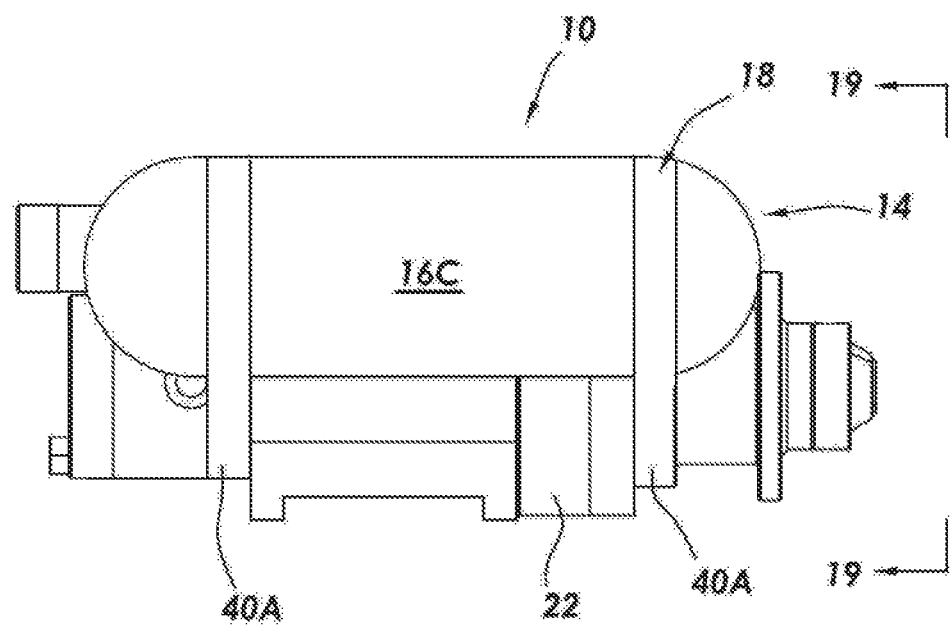
FIG. 18 is a side elevational view of an embodiment of the present invention in which a buoyancy module comprises a plurality of elongated syntactic foam tubular elements.
Figure 19:
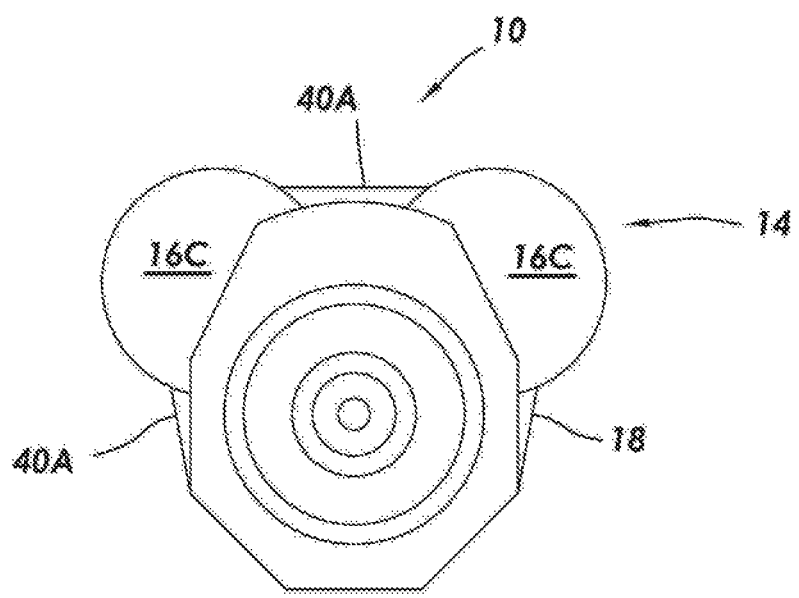
FIG. 19 is an end view of the embodiment of FIG. 18 taken from line 19-19 of FIG. 18.

FIGS. 18 and 19 illustrate yet another embodiment of friction welding tool system 10 in which buoyancy is provided by a plurality of syntactic foam tubes or pontoons 16D and engagement system 18 is provided by strap 40A. This embodiment has the benefit of a better operator view across the top of friction welding tool 22. Similarly, providing a sighting grove along to top of syntactic foam assemblies 16C or, returning to FIGS. 3A and 3B, providing offset enlarged lobs to the shoulders of saddle shaped buoyancy module 16B could provide this benefit.

FIGS. 20A-20C are perspective views illustrating the assembly and installation of one particularly advantageous embodiment of the present invention. Here buoyancy module 14 is a syntactic foam ring 16E manufactured to form a one piece ring tightly fitted to the exterior of a portable friction welding tool 22. Machining operations for conforming the interior of ring 16E to tightly receive the exterior of tool 22 may be facilitated by forming the ring in two pieces. However, if that is the case, in this embodiment the two pieces are joined by gluing or other normal syntactic foam fabrication practice to form the one piece ring before installation. The removed sections in the illustrations of FIGS. 20A and 20B are taken out for illustrative purposes only to reveal what is happening within ring.

FIG. 20A is an assembly step before portable friction welding tool 22 is engaged. Here two diver-assist handles 106 are secured with bolts 108 through predrilled apertures 109 through the thickness of the ring and the ends are captured with pairs of washers and nuts 104. While very resistant to water pressure, syntactic foam doesn't resist localized impact well and it is desirable to capture the syntactic foam between significant surface areas. Here the diver assist handles, bolted through the syntactic foam are suitable for handling operation underwater in guiding assembled portable friction welding systems into place.

FIG. 20B illustrates the next assembly step wherein portable friction welding tool 22 in press fit into syntactic ring 16E. It will be appreciated that the shape of the portable friction welding tool in this embodiment has an overall taper to it and it will only insert into ring 16E from one direction in a specific orientation and will not pass though the other side and secured against withdrawal by lip 118A of foam retaining strap 118. After tool 22 is in place, threaded bars 110 installed in predrilled apertures 112 (see FIG. 20A) are screwed directly into tapped holes 114 in the body of tool 22. Provisions to secure ring 16E about tool 22 are completed with installing foam retaining strap 118, here conveniently combined with a robust lift handle 120 suitable for onshore (dry weight) lift purposes. That assembly includes spacing coupling nut 122 providing a setoff for handle 124 which is secured with hex bolts 126 or the like. FIG. 20C illustrates an assembled syntactic foam ring 22 secured about portable friction tool 122.

FIG. 21 illustrates that assembly as part of a complete portable friction welding assembly including a portable friction welding tool and, in this case, a pivot and rotation hardware assembly 130 which will be carried with the tool in locating on a preinstalled clamp base 134.

It is to be understood that the methods described herein may be implemented in various forms and those skilled in the art should appreciate that they can readily use the disclosed conception and specific embodiments as a basis for designing or modifying other structures for carrying out the same purposes of the present invention as defined by the appended claims. The detailed description describes several distinct embodiments and it will be understood that not all of that detail, while exemplary, is essential to the claimed invention. Thus, other modifications, changes and substitutions are intended to the foregoing disclosure in some instances some features of the invention will be employed without a corresponding use of other features. Accordingly, it is appropriate that the appended claims be construed broadly and in a manner consistent with spirit and scope of the invention herein.

What is claimed is:

1. A buoyancy system for facilitating diver directed underwater joining operations to connect a fixture to a substrate, said buoyancy system comprising: a portable friction welding tool assembly having a center of gravity and a longitudinal axis said portable friction welding tool assembly comprising:
   a friction welding tool; and
   a clamp system engageable to the substrate; an engagement system removably securable to the portable friction welding tool assembly with a center of center of gravity; and
   a buoyancy module supportively connectable to the engagement system and having a center of buoyancy.

2. A buoyancy system in accordance with 1 where in the buoyancy module is a donut shaped float configured to encircle the friction welding tool.

3. A buoyancy system in accordance with claim 2 wherein the donut shaped float is releasably securable to the friction welding tool and wherein the engagement system further comprises:

a two part clam-shell engagement system utilizing a hinge joining one edge of the two parts of clam-shell engagement system of the donut shaped float; and a latch system for connecting the distal ends of the donut shaped float.

4. A buoyancy system in accordance with claim 2 wherein the donut shaped float is releasably securable to the friction welding tool and wherein the engagement system comprises:

a two part clam-shell engagement system utilizing a hinge joining one edge of the two parts of the clam-shell engagement system of the donut shaped float; and at least one strap circumferentially secured about the donut shaped float.

5. A buoyancy system in accordance with 1 wherein the buoyancy module is a one piece tubular shaped syntactic foam float configured to encircle the friction welding tool, wherein the engagement system further comprises:

one or more foam retaining straps on the exterior of the tubular shaped syntactic foam float; and a fastener connecting the foam retaining straps to the friction welding tool in a manner capturing the tubular shaped syntactic foam float in place around the friction welding tool.

6. A buoyancy system in accordance with claim 5 wherein the tubular shaped syntactic foam float is axially elongated and extends toward a distal end of the portable friction welding tool assembly to provide compensation for the weight of the clamp whereby the buoyant forces and the weight distribution of the friction welding tool assembly balance to support the portable friction welding tool assembly in a horizontal orientation.

7. A buoyancy system in accordance with claim 5, wherein the buoyancy module presents a center of buoyancy which, when the buoyancy module is in engagement about the friction welding assembly, is in axial alignment with, but vertically separated from a center of gravity for the friction welding tool assembly, whereby the friction welding tool is biased to a right side up rotational orientation during diver deployment.

8. A buoy system in accordance with claim 7 wherein the bias toward the horizontal balance minimal resistance to manipulation in vertical plane through the longitudinal axis of the friction welding tool assembly due to the proximity of the center of gravity and the center of buoyancy.

9. A buoyancy system in accordance with claim 5 wherein the engagement system further comprises an elongated threaded bar have a first end and a second end, the first end of the elongated threaded bar engaging the foam retaining strap, the threaded bar passing through the tubular shaped syntactic foam float and engaging the friction welding tool on the second end, whereby the buoyancy module is both secured by the threaded bar and captured between the foam retaining strap and the friction welding tool.

10. A buoyancy system in accordance with claim 9 wherein the engagement system further comprises:

longitudinal tapered exterior on the friction welding tool;

a lip on the foam retaining strap disposed to engage a transverse edge on the syntactic foam float;

whereby the buoyancy module is secure the threaded bar, captured between the foam retaining strap and the friction welding tool, and axially captured between an increasing diameter of the tapered friction welding tool seat in the syntactic foam float and the engagement of the lip of the foam retaining strap with transverse edge of the syntactic foam float.

11. A buoyancy system for facilitating diver directed underwater joining operations using a portable friction welding tool assembly having a center of gravity and a longitudinal axis, said portable friction welding tool assembly having at least a friction welding tool and a clamp system engageable to a substrate, said buoyancy system comprising:

an engagement system removably securable to the portable friction welding tool assembly with a center of center of gravity; and a buoyancy module supportively connectable engagement system and having a center of buoyancy;

wherein the buoyancy module is a one piece tubular shaped syntactic foam float configured to encircle the portable friction welding tool assembly and wherein the engagement system further comprises:

one or more retaining straps on the exterior of the tubular shaped syntactic foam float; and a fastener connecting the foam retaining straps to the friction welding tool in a manner capturing the tubular shaped syntactic foam float in place around the portable friction welding tool assembly.

12. A buoyancy system in accordance with claim 11 wherein the tubular shaped syntactic foam float is an axially elongated and donut shaped float which extends toward a distal end of the portable friction welding tool assembly to provide compensation for the weight of the clamp hereby the buoyant forces and the weight distribution of the friction welding tool assembly balance to support the friction welding tool assembly in a horizontal orientation.

13. A buoyancy system in accordance with claim 11, wherein the buoyancy module presents a center of buoyancy which, when the buoyancy module is in engagement about the portable friction welding assembly, is in axial alignment with, but vertically separated from a center of gravity for the portable friction welding tool assembly, whereby the portable friction welding tool assembly is biased to a right side up rotational orientation during diver deployment.

14. A buoyancy system in accordance with claim 11 wherein the engagement system further comprises an elongated threaded bar have a first and a second end, the first end of the elongated threaded bar engaging the foam retaining strap, the threaded bar passing through the tubular shaped syntactic foam float and engaging the portable friction welding tool assembly, whereby the buoyancy module is both secured by the threaded bar and captured between the foam retaining strap and the portable friction welding tool assembly.

15. A buoyancy system accordance with claim 14 wherein the engagement system further comprises:

longitudinally tapered exterior on the portable friction welding tool assembly; and a lip on the foam retaining strap disposed to engage a transverse edge on the syntactic foam float;

whereby the buoyancy module is secured by the threaded bar, captured between the foam retaining strap and the portable friction welding tool assembly, and axially captured between an increasing diameter of the tapered portable friction welding tool assembly seated in the syntactic foam float and the engagement of the lip of the foam retaining strap.

* * * * *